Aug. 5, 1924.

L. PICTET ET AL 1,503,766

DEVICE FOR PROJECTING AND VIEWING STEREOSCOPIC PICTURES

Filed Dec. 5, 1923

Inventors:
Lucien Pictet and Mario Cantoni
per: [signature]
Attorney.

Patented Aug. 5, 1924.

1,503,766

UNITED STATES PATENT OFFICE.

LUCIEN PICTET AND MARIO CANTONI, OF GENEVA, SWITZERLAND.

DEVICE FOR PROJECTING AND VIEWING STEREOSCOPIC PICTURES.

Application filed December 5, 1923. Serial No. 678,630.

*To all whom it may concern:*

Be it known that we, LUCIEN PICTET, a citizen of the Swiss Republic, and MARIO CANTONI, a subject of the King of Italy, both residing at 10 Rue Senebier, Geneva, Switzerland, have invented new and useful Improvements in Devices for Projecting and Viewing Stereoscopic Pictures, of which the following is a specification.

The present invention relates to devices for obtaining stereoscopic views of projections by means of the application of polarized light.

The invention comprises a projection apparatus and binoculars of which the combination makes it possible to observe a stereoscopic projection with a perfect impression of the relief. The device is applicable as well to the projection of simple stereoscopic views as to ordinary or stereoscopic kinematography and to the projection of opaque bodies, more particularly of stereoscopic views on opaque paper.

The device according to the invention is characterized by the provision of a single source of light transmitting its rays to two distinct or combined projection apparatus by means of two juxtaposed mirrors which reflect these rays in the shape of two parallel or converging light-pencils spaced in relation to each other of the quantity necessary to a good luminosity of the two optical systems.

Every source of light emits rays in all directions, but only the rays reaching the condenser are used. In the novel device according to the invention use is made not only of the backward rays, but also of the lateral rays which are usually lost. In this manner about twice as many rays are utilized and the intensity obtained on the projection screen remains substantially the same as that which would be obtained in two apparatus with two sources of light each of the same power as the single source required in the present device. This conduces to a much better utilization of the light, a minimum heating of the apparatus, and an important economy in the initial cost of the apparatus and in the consumption of luminous power.

The two juxtaposed mirrors may be provided with adjusting means whereby the light-pencils which they reflect may be moved in relation to each other and to the source of light.

In all polarization devices of known type comprising piles of glass, employing two pencils of polarized light for the projection of two stereoscopic pictures through the medium of two distinct or combined optical systems, the polarizing elements are set in such a manner that their respective plane of polarization will be horizontal and vertical. This method of setting makes it possible to obtain a good light on the whole surface of the negative and, when the polarizing elements are piles of glass, allows of such elements being rectangular and corresponding to analyzing binoculars of which the piles of glass are also rectangular, but these piles, placed the one vertically and the other horizontally, have the drawback that the polarized light-pencils are displaced by refraction in the glasses, the one in the direction of the height and the other in the direction of the width; it then becomes very difficult to correct these two different displacements in such manner that the light-pencils will remain focused upon the pictures of the stereoscopic negative; the luminosity ceases to be equal on the two pictures, and the stereoscopic impression suffers accordingly. This drawback becomes still more noticeable when the projected pictures are viewed through analyzing binoculars. Indeed, owing to these refractions of the light rays, the points of reception in the eyes will not be at the same height for each eye, and the eyes will have to accommodate themselves, the one in height and the other in width in order to correct these differences, hence an appreciable fatigue.

Such analyzing binoculars moreover possess the disadvantage that they have a right and a wrong side, one of the ends having to be placed before the eyes: if the other end is placed before the eyes, they do not any more polarize in the required direction.

In order to avoid these drawbacks, while maintaining a good luminosity of the negatives, the polarizing elements of the device according to the invention are set in such a manner that their plane of polarization forms an angle of 45° to the horizon. The polarizing elements and the corresponding analyzing binoculars refract the light in the horizontal direction. The two light-pencils illuminate the two pictures equally and, as to the analyzing binoculars, the eyes accommodate themselves much more easily and without any fatigue, as the displacements are both symmetrically out of axis. Further there is no more front end and back end to the said binoculars, which polarize as well in one direction as in the other.

The shape of the glasses constituting the piles of glass becomes a parallelogram of the lozenge type (it is however not necessary for the four sides of this parallelogram to be equal). The supports of these glasses remain rectangular, but the glasses are placed according to a diagonal, while maintaining the inclination required for a good polarization. The line of intersection of these two piles, of lozenge shape, placed at right angles to each other, between them, is shorter than for any other setting: The single source of light may therefore be brought nearer to the pictures to be projected, which conduces to a better utilization of the light and to an increase of the luminous field.

In the accompanying drawings:

Fig. 1 is a diagrammatic plan showing the complete projection apparatus;

Fig. 2 diagrammatically shows the position of the reflecting mirrors of a stereoscopic projection apparatus applied in kinematography;

Figure 1:
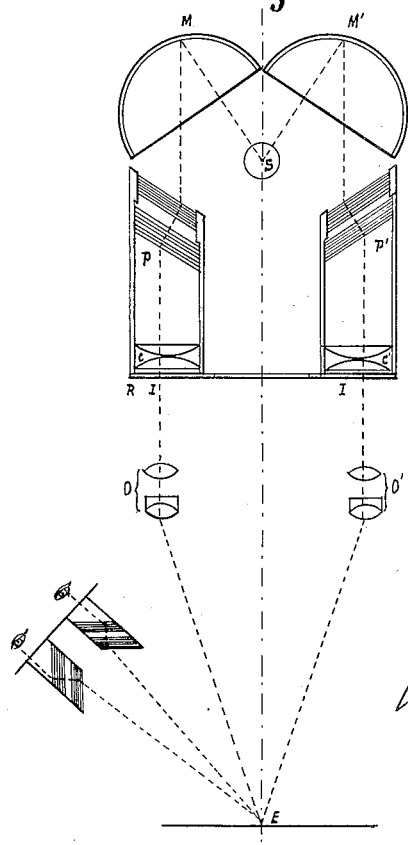

Referring to Fig. 1, the device comprises a single source of light S, two concave mirrors M and M', two polarizing elements P and P' set at 45° to the horizon, two condensers C and C', the two pictures I and I' of the stereoscopic negative R, the two objectives O and O', a projection screen E, and analyzing binoculars comprising two elements A and A' forming, like the aforesaid polarizing elements, an angle of 45° to the horizon.

The source of light S projects its rays on the mirrors M and M', which reflect same each in the shape of a parallel light-pencil, and these light-pencils each pass through the corresponding polarizing elements P and P', whereby they become polarized, and they reach the condensers C and C' which concentrate them to the required point of each of the objectives O and O' after having passed through the pictures I and I'; the objectives O and O' project same onto the screen surface E, suitable adjusting means (not shown) making it possible to obtain the superposition of the two pictures of the said screen. From the latter, the said rays are retransmitted to the analyzing binoculars of which the elements A and A', being set in the same manner as the polarizing elements P and P', only allow the passage each of one of the light-pencils.

The mirrors M and M' are provided with adjusting means (not shown), whereby their position in relation to each other or to the source of light may be varied in order to obtain a variation of the direction of the reflected light-pencils.

Figure 5:
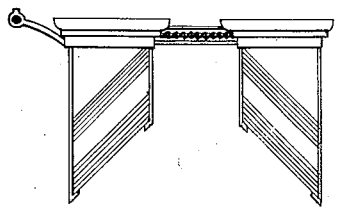
Fig. 5 is a plan view of analyzing binoculars to be used in conjunction with the described stereoscopic projection apparatus.

Referring more particularly to Fig. 5, it will be seen that the analyzing binoculars are constituted by suitable supports of square cross section in which are placed the polarizing piles of glass A and A', the planes of the latter being inclined to the extent of 45° to the horizon.

The invention is not limited to this type of binoculars, but also includes any other type wherein the polarizing elements, constituted by piles of glass, are arranged so that their planes are inclined of the same angle in relation to the horizon.

Figure 2:
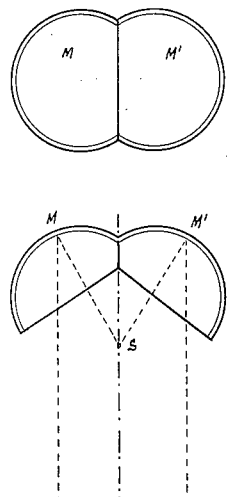

The invention further includes the application of the above described device in kinematography. It is indeed possible to use the same device including a single source of light, adjustable mirrors, polarizing elements, condensers, objectives, in combination with analyzing binoculars, to obtain the stereoscopic projection and to present to the eye of the spectator stereoscopic view on the screen either of an ordinary or of a stereoscopic film. In this application (see Fig. 2) in view of the restricted distance between the axes of the views to be projected, use may be made of mirrors M and M' cut along a chord as illustrated in the said figure.

Figure 3:
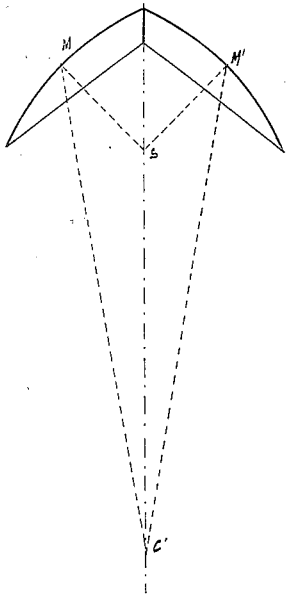
Fig. 3 shows the position of the reflecting mirrors of an apparatus for stereoscopic kinematographic projection, adapted for ordinary projection.
Figure 4:
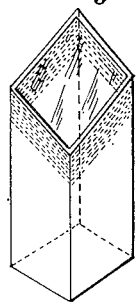
Fig. 4 is a perspective view showing the shape of a polarizing element constituted by a pile of glass, with its support.

The kinematographic apparatus, adapted in this manner, may also serve for ordinary projections, as it is possible to adjust the mirrors in such manner as to concentrate the light-pencils reflected thereby in a single point before one of the objectives (see Fig. 3).

The invention is finally also applicable to the projection of opaque bodies, and more particularly of opaque stereoscopic views.

We claim:

1. Device for projecting and viewing stereoscopic pictures comprising a pair of juxtaposed mirrors arranged to reflect the light of a single source of luminous power of the shape of two light-pencils of which the interaxial spacing is equal to that of the centres of the stereoscopic views to be projected, a pair of polarizing elements placed in the path of said light-pencils as near to the source of light as possible and constituted by two piles of glass at right angles to each other and of which the planes of polarization form an angle of 45° to the horizon, optical means for focusing the two pictures projected by the two polarized light-pencils upon the screen so that they are superposed one on the other thereon; in combination with analyzing binoculars to be interposed before the eyes of the spectator and comprising a pair of polarizing elements of which the planes of polarization form an angle of 45° to the horizon; substantially as described.

2. Device for projecting and viewing stereoscopic pictures comprising a pair of adjustable juxtaposed mirrors arranged to reflect the light of a single source of luminous power in the shape of two light-pencils of which the interaxial spacing is equal to that of the centres of the stereoscopic views to be projected, a pair of polarizing elements placed in the path of said light-pencils as near to the source of light as possible and constituted by two piles of glass at right angles to each other and of which the planes of polarization form an angle of 45° to the horizon, optical means for focusing the two pictures projected by the two polarized light-pencils upon the screen so that they are superposed one on the other thereon; in combination with analyzing binoculars to be interposed before the eyes of the spectator and comprising a pair of polarizing elements of which the planes of polarization form an angle of 45° to the horizon; substantially as described.

3. Device for projecting and viewing stereoscopic pictures comprising a pair of juxtaposed mirrors arranged to reflect the light of a single source of luminous power in the shape of two light pencils of which the interaxial spacing is equal to that of the centres of the stereoscopic views to be projected, a pair of polarizing elements placed in the path of said light-pencils as near to the source of light as possible and constituted by two piles of glass at right angles to each other and of which the planes of polarization form an angle of 45° to the horizon, adjustable means for focusing the two pictures projected by the two polarized light-pencils upon the screen so that they are superposed one on the other thereon; in combination with analyzing binoculars to be interposed before the eyes of the spectator and comprising a pair of polarizing elements of which the planes of polarization form an angle of 45° to the horizon; substantially as described.

4. In a device for projecting and viewing stereoscopic pictures as claimed in claim 1, analyzing binoculars comprising a pair of polarizing elements mounted in a suitable support and constituted by piles of glass set in such manner that their planes of polarization both form an angle of 45° to the horizon.

5. In a device for projecting and viewing stereoscopic pictures as claimed in claim 2, more particularly adapted for ordinary kinematographic projection, the provision of two adjustable reflecting mirrors cut along a chord in such manner as to bring their focuses appropriately nearer to each other, for the purpose set forth.

In testimony whereof we signed hereunto our names in the presence of two subscribing witnesses.

LUCIEN PICTET.
MARIO CANTONI.

Witnesses:
R. DELANO,
RMD. GRAND'RU.